United States Patent [19]
Fiorentini

[11] Patent Number: 5,164,752
[45] Date of Patent: Nov. 17, 1992

[54] CAMERA BACK WITH HEATING ELEMENTS FOR SELF DEVELOPING FILM

[76] Inventor: Achille Fiorentini, via Genova 23, Padova, Italy

[21] Appl. No.: 798,843

[22] Filed: Nov. 25, 1991

Related U.S. Application Data

[63] Continuation of Ser. No. 584,034, Sep. 18, 1990, abandoned.

[51] Int. Cl.⁵ .............................................. G03B 17/50
[52] U.S. Cl. .................................. 354/84; 354/289.1
[58] Field of Search ..................................... 354/83–87, 354/289.1, 299

[56] References Cited

U.S. PATENT DOCUMENTS

| | | | |
|---|---|---|---|
| 2,576,022 | 11/1951 | Land | 354/83 |
| 2,768,567 | 10/1956 | Land | 354/299 |
| 2,794,377 | 6/1957 | Fairbank | 354/299 |
| 4,119,988 | 10/1978 | Iwata et al. | 354/83 |
| 5,023,638 | 6/1991 | Siegesleuther et al. | 354/290 X |

FOREIGN PATENT DOCUMENTS 1-33538A 2/1989 Japan ................................. 354/299

*Primary Examiner*—Michael L. Gellner
*Assistant Examiner*—D. Rutledge
*Attorney, Agent, or Firm*—Dowell & Dowell

[57] ABSTRACT

A camera for containment of self-developing film which contains a thermal detector and electrical heating elements for maintaining the film within the camera at an optimum temperature.

6 Claims, 1 Drawing Sheet

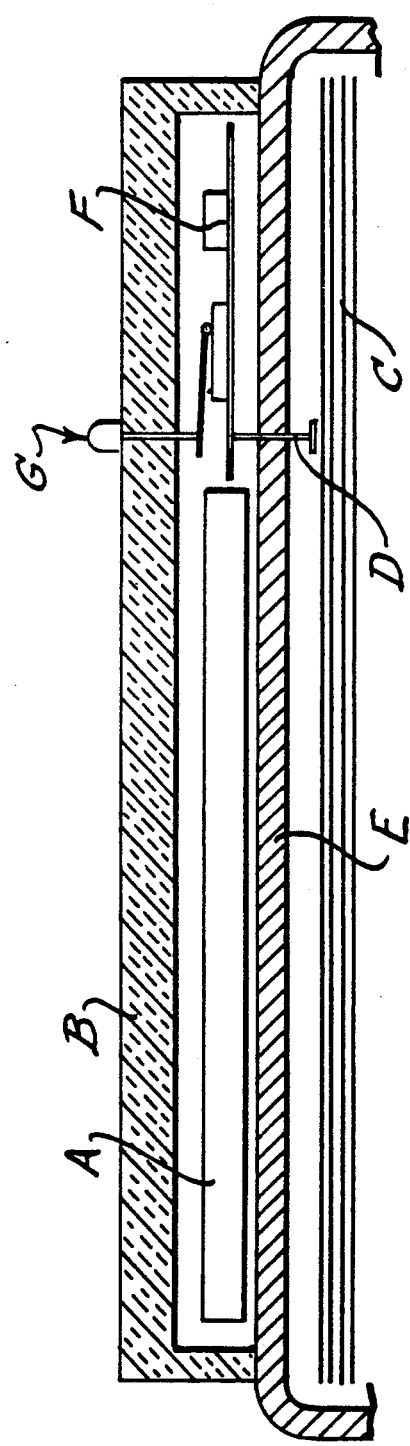

CAMERA BACK WITH HEATING ELEMENTS FOR SELF DEVELOPING FILM

This application is a continuation of application Ser. No. 07/584,034 filed Sep. 18, 1990, now abandoned.

BACKGROUND OF THE INVENTION

1. Field of the Invention

This invention is generally directed to heating elements for cameras, and more particularly to a camera which maintains a self-developing film at an optimum temperature when housed within the camera.

2. History of the Related Arts

Cameras using self-developing films have been known which incorporate heating elements. However, the problem remains to maintain the self-developing film within the camera at a developing temperature of approximately 24° C. whenever housed within the camera. It is known that the chemical process of a photograph must come about in an optimum temperature range otherwise the photographic result is comprised. At low temperatures, the chromatic alterations of the film will result in a photograph which is not properly developed. At the present, to overcome these problems, many individuals use methods which are not trustworthy, such as placing a camera on its back on a radiator in order to heat the film prior to exposing the film by taking a picture.

SUMMARY OF THE INVENTION

The present invention overcomes the aforementioned problems in the prior art with respect to maintaining the interior of a camera at the proper temperature for developing self-developing film. With the present invention, the film pack and is kept at an optimum temperature which should be approximately 24° C. The present invention provides, in the camera back, a thermal detector which is near the film pack which monitors the internal temperature of the camera. On the external portion of the camera there is an electronic circuit which continuously monitors the detector system. The electrical circuit is equipped with two warning lights, red and green, which alternatively indicate when the temperature measured by the thermal detector is 24° C. (+or−0.5°). Resistance elements are provided in the back of the camera and which are powered by batteries or a main electrical supply which may be plugged into the camera in order to maintain the interior temperature of the camera at the optimum temperature of 24° C. within the deviation range set forth above. The circuit controls on the exterior camera in connection with the thermal detector maintain the aforementioned temperature range. The back cover of the camera is protected by thermal insulation from the heating elements.

BRIEF DESCRIPTION OF THE DRAWINGS

FIG. 1 is a cross-sectional illustrational view of a camera constructed in accordance with the teachings of the present invention.

DESCRIPTION OF THE PREFERRED EMBODIMENT

With continued reference to the drawing figure, the schematic section of the camera of the present invention is shown wherein a self-developing film pack C is installed within the camera adjacent a wall E which may or may not be part of the camera. Adjacent or in contact with the wall E are electrical resistance elements A which are connected to an electronic circuit F. The electronic circuit is electrically connected to a thermal detector D which initiates the on and off of the resistance elements A. The aforementioned elements are all enclosed within the back B of the camera which is also insulated with thermal insulating material. One or more warning lights G reflect the internal temperature of the camera so as to indicate when the optimum exposure temperature of the film is achieved. As previously mentioned the optimum temperature should be approximately 24° C. (+or−0.5°). If necessary, the heating elements and thermal detectors of the present invention may be modified to be incorporated within existing camera backs.

The camera of the present invention includes a thermostatic control which may be used to regulate the temperature within the camera to provide the optimum temperature for different types of self-developing films which may have optimum temperatures which differ from the aforementioned 24° C. In addition, the electronic circuitry associated with the camera and in particular the red and green lights associated with indicating the desired temperature within the camera are connected in the electronic control circuit so that when the lights indicate an optimum condition the user knows that the film is maintained at the proper temperature, however when the lights indicate an abnormal temperature the user knows that the temperature has fallen outside of the preferred zone for proper film development.

Another monitoring situation which can be obtained utilizing the teachings of the present invention is wherein the camera back includes a large space. In these instances, resistance elements may be placed within the space between the back of the camera and the self-developing film to maintain the film continuously at the optimum temperature. As previously discussed, the heating elements may be charged either by an outside electrical source or by self-contained batteries.

I claim:

1. In a camera having a body having a back portion adjacent to which self-developing film is contained with the body and wherein the film is maintained at an optimum temperature prior to and during the exposure to an image, the improvement comprising, a heating means enclosed within said camera body adjacent said back portion thereof, a source of power supply, an electrical circuit connecting said source of power supply to said heating means, and thermostat means within said back portion of said body for regulating the electronic circuit to continuously maintain the temperature of the film within the back portion of the camera body generally at said optimum temperature prior to and during the time at which the film is exposed to an image.

2. The camera of claim 1 in which said heating means includes resistance elements disposed within said back portion.

3. The camera of claim 2 in which said back portion includes a back wall incorporating a heat insulating material.

4. The camera of claim 1 in which said thermostat is adjustable to regulate the temperature within the back portion of the body of the camera for different films.

5. The camera of claim 4 in which said electrical circuit includes one or more signal means for visually indicating that said optimum temperature of the film is maintained within said body of said camera.

6. The camera of claim 5 in which said thermostat means is regulated to maintain the temperature within said camera at approximately 24° C.

* * * * *